United States Patent
Iverson et al.

(10) Patent No.: US 10,755,600 B2
(45) Date of Patent: Aug. 25, 2020

(54) SYNTHETIC TISSUE PHANTOM FOR MEDICAL EVALUATION

(71) Applicant: St. Jude Medical, Cardiology Division, Inc., St. Paul, MN (US)

(72) Inventors: Scott Iverson, Circle Pines, MN (US); Tracee Eidenschink, Wayzata, MN (US); Theodore Paul Dale, Corcoran, MN (US); David Broman, Rogers, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 155 days.

(21) Appl. No.: 15/685,606

(22) Filed: Aug. 24, 2017

(65) Prior Publication Data
US 2018/0075777 A1 Mar. 15, 2018

Related U.S. Application Data

(60) Provisional application No. 62/381,359, filed on Aug. 30, 2016.

(51) Int. Cl.
*G09B 23/28* (2006.01)
*G09B 23/30* (2006.01)

(52) U.S. Cl.
CPC .................................. *G09B 23/30* (2013.01)

(58) Field of Classification Search
USPC ................................ 434/262, 267, 268, 272
See application file for complete search history.

(56) References Cited

U.S. PATENT DOCUMENTS

| | | | |
|---|---|---|---|
| 4,277,367 A | 7/1981 | Madsen et al. | |
| 4,481,001 A * | 11/1984 | Graham | G09B 23/285 434/267 |
| 7,419,376 B2 * | 9/2008 | Sarvazyan | G09B 23/30 434/267 |
| 7,549,866 B2 * | 6/2009 | Cohen | G09B 23/30 434/267 |
| 7,857,626 B2 * | 12/2010 | Toly | G09B 23/28 434/262 |
| 8,105,089 B2 * | 1/2012 | Hudson | G09B 23/34 434/274 |
| 8,535,062 B2 * | 9/2013 | Nguyen | G09B 23/30 434/267 |
| 8,613,621 B2 * | 12/2013 | Hendrickson | G09B 23/303 434/267 |
| 8,708,707 B2 | 4/2014 | Hendrickson et al. | |
| 8,915,742 B2 | 12/2014 | Hendrickson et al. | |
| 8,968,003 B2 | 3/2015 | Hendrickson et al. | |
| 9,017,080 B1 * | 4/2015 | Placik | G09B 23/285 434/269 |
| 9,548,002 B2 * | 1/2017 | Black | G09B 23/285 |
| 2012/0028231 A1 * | 2/2012 | Misawa | G09B 23/30 434/267 |
| 2012/0214144 A1 * | 8/2012 | Trotta | G09B 23/281 434/267 |
| 2015/0037775 A1 * | 2/2015 | Ottensmeyer | G09B 23/34 434/271 |
| 2015/0086955 A1 * | 3/2015 | Poniatowski | G09B 23/28 434/267 |

* cited by examiner

*Primary Examiner* — Kurt Fernstrom
(74) *Attorney, Agent, or Firm* — Lerner, David, Littenberg, Krumholz & Mentlik, LLP (57) ABSTRACT

Disclosed are synthetic tissue phantoms, which mimic the properties of real human or animal tissue, and methods of manufacturing the same.

20 Claims, 4 Drawing Sheets

FIG. 4
GRAPH 1

SYNTHETIC TISSUE PHANTOM FOR MEDICAL EVALUATION

CROSS-REFERENCE TO RELATED APPLICATION

The present application claims benefit of the filing date of U.S. Provisional Application No. 62/381,359 filed Aug. 30, 2016, the disclosure of which is hereby incorporated herein by reference.

BACKGROUND OF THE INVENTION

This invention generally relates to the field of multi-layered materials, including those that closely mimic a property of human or animal tissue or components of the body known as synthetic tissue phantoms. Synthetic tissue phantoms can be used for evaluating medical devices for research, training, and user feedback purposes. The invention also relates to the field of materials that can be used to simulate specific tissues such as fat tissue or skin tissue.

Synthetic tissue phantoms include tissue-mimicking materials and are used as tools for the assessment and verification of performance standards in daily clinical practices. Tissue-mimicking materials should exhibit the same properties as those of the actual human or animal tissue.

An example of a synthetic tissue phantom that includes tissue-mimicking materials is disclosed in U.S. Pat. No. 4,227,367. In one embodiment, the tissue-mimicking material is prepared from a mixture of gelatin, water, n-propanol, and graphite powder. In another embodiment, the tissue-mimicking material includes a mixture of gelatin and oil.

U.S. Pat. No. 4,481,001 discloses a skin model for practicing intradermal injections of fluids. The skin model includes a subcutaneous-simulating layer, a dermis-simulating layer, and an epidermis-simulating layer.

Another example is an artificial breast phantom disclosed in U.S. Pat. No. 7,419,376. In one embodiment, the tissue-mimicking material includes a two-component silicone gel having varying elastic properties and Young's modulus from 3 kPa to 600 kPa. See also U.S. Pat. Nos. 8,613,621, 8,708,707, 8,915,742 and 8,968,003.

There is always room for improvement in synthetic tissue phantoms that mimic at least some aspects human or animal tissue for use in research and training of professionals.

There is also a desire for synthetic tissue phantoms for use in training clinical practitioners in inserting medical devices, between layers such as the skin and muscle.

It is also desirable to provide improvements in synthetic tissue phantoms such as phantoms that can be made more simply, efficiently, and/or effectively, but nonetheless, provide the degree of realism necessary to satisfy their objective. In particular, it is desirable to provide fatty materials that can be used to produce fat layers, which provide sensory feedback to the user and are similar to the fat layer of a human or animal when used as described. And improved skin material and layer are also contemplated.

In some embodiments, the invention can address at least one of these desires—it need not address them all.

BRIEF SUMMARY OF THE INVENTION

In one embodiment, there is provided a multi-layered structure comprising: a first layer of a rubber material in an amount of about 85% or more by volume of that layer and a second layer including a rubber material in an amount of from about 15 to about 90% by volume of that layer; wherein at least one of the first and the second layers further comprises an oil. The first layer has a Shore hardness that is greater than that of the second layer. In some further aspects of this embodiment, both the first and the second layers include an oil. In some aspects of this embodiments, the Shore hardness of the first layer is about A8 or greater and the Shore hardness of the second layer is about OO50 or less. In some aspects, the Shore hardness of the first layer is measurable on the A scale and the Shore hardness of the second layer is only measurable on the OO scale. The first and second layer may include other additives such as thickeners, softeners, lubricants, pigments, and the like, in conventional amounts. The multilayered construct may also include additional layers such as, without limitation, a third layer, an edge layer, and a reinforcing layer. These additional layers can have any Shore hardness.

In another embodiment, there is provided a multi-layered structure comprising: a first layer of a silicone rubber in an amount from about 90% to about 99.9% by volume of that layer and an oil in an amount of no more than about 10% by volume of that layer; a second layer including an oil in an amount of no less than about 10% by volume of that layer, at least one softener from about 30% to about 80% by volume of that layer, and a silicone rubber in an amount of from about 10% to about 60% by volume of that layer; and a third layer of a silicone rubber in an amount of from about 95% to about 100% by volume of that layer; wherein the first layer has a Shore hardness of from about at least A10 to about A40, the second layer has a Shore hardness of about OO0 to about OO40, and the third layer has a Shore hardness of at least about A0. The layers may include other additives such as thickeners, softeners, lubricants, pigments, and the like, in conventional amounts. The multilayered construct may also include additional layers such as, without limitation, a fourth layer, an edge layer, and a reinforcing layer. One or more of these layers may also consist essentially of a single silicone rubber. The preferred oil is a mineral oil.

In one embodiment, there is provided a synthetic tissue phantom that includes: (a) a synthetic skin layer comprising a first amount of a rubber material in the amount of about 94-100% by volume of the skin layer, a lubricant in the amount of about 0.0-5% by volume of the skin layer, a thixotropic agent in the amount of from about 0.0 to about 2.0% by volume of the skin layer, and a flesh pigment in the amount of from about 0.0 to about 3% by volume of the skin layer; (b) a synthetic fat layer comprising a second amount of a rubber material in the amount of about 15-40% by volume of the fat layer, and in another aspect in the amount of from about 30 to about 60% by volume of the fat layer, a lubricant in the amount of about 10-40% by volume of the fat layer, and in another aspect, the lubricant may be in the amount of about 20% to about 35% by volume of the fat layer, a softener in the amount of about 0.0-35% by volume of the fat layer, and a pigment in the amount of about 0-3% by volume of the fat layer; (c) a synthetic muscle layer comprising a third amount of a rubber material in the amount of about 95-100% by volume of the muscle layer, and a pigment in the amount of about 0-3% by volume of the muscle layer; and (d) a reinforcing layer, wherein the reinforcing layer is in intimate contact with, or integral with the skin layer. In some aspects of this embodiment, the Shore hardness of the skin layer (including a reinforcing layer) is higher than that of the muscle layer which in turn is higher than the Shore hardness of the fat layer. In particular, the skin layer may have a Shore hardness of about A8 or above, and in an another aspect, from about A10 to about A40, and in another aspect a Shore hardness of about A15 to about A35, the fat layer may have a Shore hardness of about OO50 or less, and in another aspect, from about OO0 to about OO40, and in another aspect, from about OO01 to about OO30, and the muscle layer has a Shore hardness of at least A0, in some aspects may have a Shore hardness of from about A0 to about A30, and in another aspect of this embodiment, a Shore hardness of from about A5 to about A15.

In one embodiment, a synthetic tissue phantom is provided that includes: a first semi-anatomic skin layer including from about 0.1% to about 10% mineral oil by volume of that layer, from about 0.1% to about 0.75% by volume of that layer of at least one pigment, from about 0.0% to about 0.15% by volume of that layer of a thickener, and further consisting essentially of a single silicone rubber in an amount of from about 89.0% to about 99.8% by volume of that layer, the first layer including a reinforcing layer applied thereto or imbedded therein; a second semi-anatomic fat layer including from about 10 to about 40% mineral oil by volume of that layer, from about 0.0% to about 0.75% by volume of that layer of at least one pigment, from about 15% to about 30% by volume of that layer of at least one softener and further consisting essentially of a single silicone rubber in an amount of from about 30% to about 60% by volume of that layer; and a third semi-anatomic muscle layer including substantially no lubricant, from about 0% to about 2% by volume of that layer of at least one pigment and further consisting essentially of a single silicone rubber in an amount of from about 98% to about 100% by volume of that layer; wherein the first layer and the reinforcing layer having a combined Shore hardness which is greater than that of the third layer and the third layer has a Shore hardness which is greater than the second layer.

In particular, the first layer, or skin layer, and the reinforcing layer together have a Shore hardness of from about A15 to about A35, the second layer, or fat layer, has a Shore hardness of about OO01 to about OO30, and the third layer, or muscle layer, has a Shore hardness of about A0 to about A30. The first layer (including the reinforcing layer), may have a thickness of from about 1 mm to about 4 mm the second layer may have a thickness of from about 4 mm to about 13 mm, and the third layer may have a thickness of from about 4 mm to about 26 mm.

The first layer may optionally include one or more of mineral oil in an amount of from about 1 to about 10% by volume, a thixotropic agent in an amount of from about 0.0 to about 2.0% by volume and a pigment in an amount of from about 0.0 to about 0.75% by volume. The first layer may also have mineral oil in an amount of about 1 to about 10% by volume. The second layer may optionally include from about 0.0 to about 0.75% of a pigment and may include from about 20 to about 35% of mineral oil by volume.

In another embodiment, there is contemplated a synthetic tissue phantom comprising: a first layer of silicone rubber in an amount of from about 89% to about 99.9% by volume; a second layer including from about 15% to about 30% mineral oil by volume, from about 15% to about 30% of at least one softener and silicone rubber in an amount of from about 35% to about 55% by volume; and a third layer of silicone rubber in an amount of from about 98% to about 100% by volume; wherein at least one of the layers is semi-anatomic and the first layer and third layer have a Shore hardness that is greater than the second layer. In some embodiments, the first layer also has a Shore hardness that is greater than the third layer.

In particular, in the above phantom, the first layer has a Shore hardness of from about A5 to about A40, or from about A10 to about A30, the second layer has a Shore hardness of about OO0 to about OO50, or from about OO1 to about OO30, and the third layer has a Shore hardness of about A0 to about A30, or from about A5 to about A15. In some aspects, the first layer has a Shore hardness of from about A20 to about A30, the second layer has a Shore hardness of about OO5 to about OO20, and the third layer has a Shore hardness of about A5 to about A15. In some aspects, the first layer has a thickness of from about 1 mm to about 5 mm, the second layer may have a thickness of from about 4 mm to about 13 mm, and the third layer may have a thickness of from about 4 mm to about 26 mm. The first layer of this embodiment may also optionally include one or more of mineral oil in an amount of from about 1% to about 10% by volume, a thixotropic agent in an amount of from about 0.01% to about 0.5% by volume and a pigment in an amount of from about 0.1% to about 0.75% by volume. The first layer may also have mineral oil in an amount of about 1% to about 5% by volume. The second layer may optionally include from about 0.1% to about 0.75% of a pigment and may include from about 20% to about 35% of mineral oil by volume. The third layer may optionally include a pigment in an amount of from about 0.1% to about 0.75% by volume.

BRIEF DESCRIPTION OF THE DRAWINGS

Various embodiments in accordance with the present disclosure will now be described with reference to the appended drawings. It is to be appreciated that these drawings depict only some embodiments and are therefore not to be considered limiting of its scope.

DETAILED DESCRIPTION

A detailed description of the present invention follows with reference to the accompanying drawings, in which like elements are indicated by like reference numbers and numerals.

Figure 1:
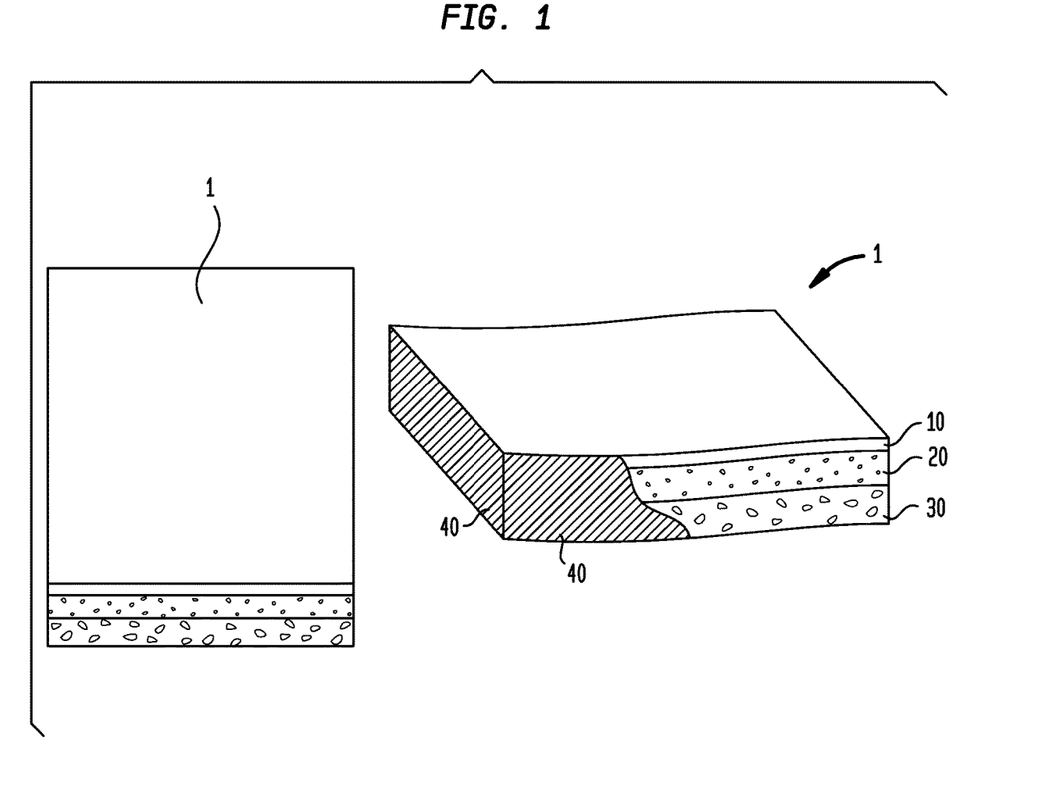
FIG. 1 is a perspective view of an embodiment of the tissue phantom in accordance with the invention.
Figure 2:
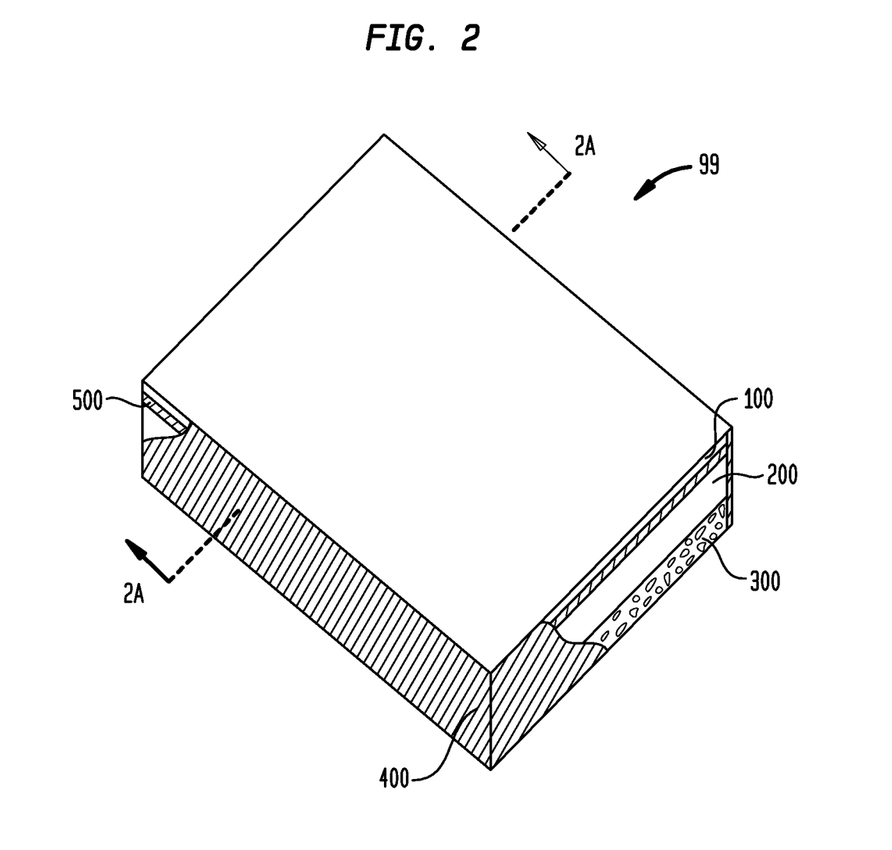
FIG. 2 is a cross-sectional view of an embodiment of a multilayered construct in accordance with the invention.

FIG. 1 shows one possible construct of a multilayered construct 1 in accordance with the invention. In this construct, there is a first layer 10, a second layer 20, (as shown in FIG. 2 as 200) and a third layer 30. The first and third layers sit above and below the second layer, forming a sandwich-like construct. This construct may also include an edge layer 400 around its periphery covering at least a portion of one or all of the sides of layers 10, 20, and 30. This edge layer can provide protection to exposed surfaces and help contain material imbedded, dispersed, and otherwise disposed in one or more of layers 10, 20, and 30. It is understood that the present invention includes each of these layers individually and in any arrangement and that additional layers, or fewer layers, may be present. For example, any or all of layers 10, 20, and 30 can include a reinforcing material, which can also be in the form of a layer 50 (as shown in FIGS. 2 and 3 as layer 500).

Figure 2A:
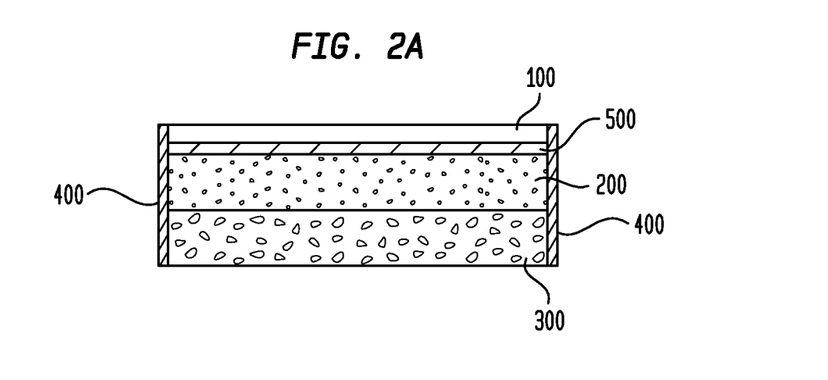
FIG. 2A is a side view of an embodiment of a multilayered construct in accordance with the invention.

FIG. 2 is a cross-sectional view of self-supported tissue phantom 99. FIG. 2A is a side view of self-supported tissue phantom 99 of FIG. 2. The phantom includes a first layer 100, which in the illustrated embodiment is a simulated skin layer having predetermined properties similar to that of human or animal skin and, optionally including one or more reinforcement layer(s) 500, a second layer 200, which in the illustrated embodiment is a simulated fat layer having predetermined properties similar to that of human or animal fat, and a third layer 300, which in the illustrated embodiment is a simulated muscle layer having predetermined properties similar to that of human or animal muscle. "Predetermined properties similar to that of human or animal skin" can include any property. For a non-limiting example, the skin layer 100 may have the appearance of human skin, by design, but may not have its feel or thickness. The predetermined property similar to that of a human or animal is therefore its appearance in that example.

In some embodiments, the multilayered construct 1 is a phantom 99 of a human or animal tissue or organ and is anatomically correct. A "phantom" is meant to mean a model or other representation. In other embodiments, phantom 99 is at least semi-anatomic, which means that it simulates at least one predetermined property which can be any aspect of a body tissue or organ. By way of a non-limiting example, phantom 99 intending to simulate skin layer 100, muscle layer 300, and fat layer 200 disposed between layers 100 and 300, is semi-anatomic if it provides the relative feel of skin, fat, and/or muscle layers when penetrated by a medical device, even if the layers are not of the correct anatomical color, thickness, and the like. In another non-limiting example, a phantom is semi-anatomic if skin layer 100 is colored or provided with surface details (such as hair follicles, surface contours, and the like) such that it resembles human or animal skin, but does not have the consistency of human or animal skin and/or if the other layers (i.e. fat or muscle layer) do not have an anatomically accurate appearance. Phantom 99 of the present invention need not be anatomically or semi-anatomically correct. Phantom 99 of this aspect of the invention may also include edge layer 400, reinforcing layer 500, and/or other layers or features meant to simulate other anatomical structures such as, without limitation, fascia, peritoneum, pleura, bone or blood vessels.

In one aspect, layers of the multilayered construct or phantom have different purposes or predetermined properties. For example, layers of the multilayered construct have different appearances. In another aspect, layers of the multilayered construct have different dimensions and/or consistencies. In still another aspect, layers of the multilayered construct will provide different sensory feedback to, for example, an operator performing a simulated surgical procedure using any one of the multilayered constructs of the invention. It is possible that a single multilayered construct may embody many or all of these aspects simultaneously.

While the layers shown in FIGS. 1 and 2 are generally of consistent dimensions, and each may be a flat, planer structure, this is not a requirement of the present invention. A simulated skin layer may have variable thickness. For example, a portion of simulated skin layers 10 or 100 may be made into a thicker "dome" to simulate a breast and the surrounding portion of the layer may be more planar resembling the skin surrounding a breast. This could assist a medical professional in orientation and positioning of instruments or making simulated incisions in the chest area surrounding a breast. Similarly, simulated muscle layers 30 or 300 may be produced with various contours and thicknesses, which may then influence the shape and contour of simulated skin layers 10 and 100 or simulated fat layers 20 and 200, if any, overlaying the muscle layers 30 and 300, respectively. This could assist a medical professional using the phantom to simulate a subcutaneous procedure performed near different muscle groups learning how to navigate a medical device accordingly.

One particular aspect of the invention is the discovery that the properties of various layers, and in particular, their ability to simulate the feel of anatomical layers in terms of, for example, the sensory feedback that they provide to one using them to simulate a surgical procedure, can be improved by the addition of at least some oil to the material from which that layer is produced. In particular, in terms of phantom 99 of the invention, oil can be used to provide a simulated fat material and/or skin material that can be used in the construction of phantoms in accordance with the present invention and the invention includes these materials, layers made from them, methods of making same, as well as phantoms produced including this oil-containing material.

For a non-limiting example of this aspect of the invention, layer 10, layer 100, layers 20, or layer 200 can include at least some amount of oil. In one embodiment, each of the layers 10, 100, 20, or 200 may include at least some oil and the amount of oil in layers 10 and 100 may differ from the amount used in layers 20 and 200. In particular, the amount of oil in layers 10 and 100 is often less than the amount used in layers 20 and 200. By way of example, layers 10 and 100 can include substantially no oil content while layers 20 and 200 can include from about 1% to about 40% of an oil, preferably mineral oil. In another embodiment, layers 10 and 100 can include from about 1% to about 10% of a mineral oil and layers 20 and 200 may include a higher oil content than used in layers 10 and 100. In still another embodiment, layers 10 and 100 can include from about 1 to about 10% of a mineral oil and layers 20 and 200 can include from about 10 to about 40% of a mineral oil. In a further embodiment, layers 10 and 100 can include from about 1 to about 5% of a mineral oil while layers 20 and 200 include from about 20 to about 35% of a mineral oil. All percentages described herein are percent by volume of the particular layer unless otherwise specified.

Thus, in one embodiment, there is provided a synthetic tissue phantom 99 comprised of a first layer 100 meant to at least semi-anatomically represent a skin layer of a human or animal, a third layer 300 meant to at least semi-anatomically represent at least one muscle of a human or animal and a second layer 200 disposed in between the first layer 100 and the third layer 300 meant to at least semi-anatomically represent a layer of human or animal fat, wherein at least one of the first layer 100 and the second layer 200 is composed of a mixture of at least one silicone rubber and some amount of an oil. In another embodiment of the phantom 99 just described, at least the second layer 200 is composed of at least one silicone rubber and at least one oil in an amount of about 10% to about 40% by volume of the material used to make layer 200. In still another embodiment of phantom 99, at least the first layer 100 is composed of at least one silicone rubber and at least one oil in an amount of about 1% to about 10% by volume of the material used to make layers 100. In yet another embodiment of phantom 99, at least first layer 100 is composed of at least one silicone rubber and at least one oil in an amount of about 1% to about 10% by volume of the material used to make layer 100 and at least the second layer 200 is composed of at least one silicone rubber and at least one oil in an amount of about 10% to about 40% by volume of the material used to make layer 200. In each of these embodiments, the phantom may also include edge layer 400 and/or a reinforcing layer 500. In one embodiment, the reinforcing layer 500 is disposed on, affixed to or formed integrally with first layer 10 or 100.

In another embodiment, there is provided synthetic tissue phantom 99 including a first layer 100 meant to at least semi-anatomically represent a skin layer of a human or animal, a third layer 300 meant to at least semi-anatomically represent at least one muscle of a human or animal and a second layer 200 disposed in between the first layer 100 and the third layer 300 meant to at least semi-anatomically represent a layer of human or animal fat, wherein at least one, and possibly all of the layers, "consist essentially of" a single silicone rubber. It will be understood that by "consisting essentially of" in this context is meant to exclude mixtures of different silicone rubbers in amounts that could change the basic and novel characteristics of the primary silicone rubber (such as an amount sufficient to alter the Shore hardness of a layer made from that material which is otherwise of identical composition by more than about 10%).

By way of example, U.S. Pat. No. 8,613,621 describes an artificial epidermis-dermis layer that is formed of a combination of a first silicone rubber that, when mixed and cured as directed by the manufacturer, has a Shore hardness of A10 and a second silicone rubber that, when mixed and cured as directed by the manufacturer, has a Shore hardness of OO50. The actual final Shore hardness of this composite material is not disclosed, but would logically be between a Shore hardness of OO50 and A10. A single silicone rubber according to the present invention would include a silicone rubber having a Shore hardness of A10 or a Shore hardness of OO50 but not the combination of A10 and OO50. "Consisting essentially of" is not meant to limit the use of any other ingredient in the composition of that layer such as lubricants, softeners, thickeners, pigments, and the like. In particular, second layer 200 of phantom 99 just described includes at least one oil in an amount of about 10% to about 40% by volume of the material used to make layer 200 and the first layer 100 includes at least one oil in an amount of about 1% to about 10% by volume of the material used to make layer. Phantom 99 of this embodiment may also include an edge layer 400 and/or a reinforcing layer 500. In one such embodiment, the reinforcing layer 500 is disposed on or formed integrally with the first layer 100. The oil may be any oil, but is preferably a mineral oil.

The layered phantom 99 structure of FIG. 2 includes a skin-like layer 100, a muscle-like layer 300, and a fat-like layer 200. This exemplary phantom 99 can be used for any number of purposes, including, without limitation, simulating the insertion and placement of a subcutaneous device, such as an implantable cardiac monitor (for example, St. Jude's Confirm Rx™ or Medtronic's LINQ™ insertable cardiac monitor) or a subcutaneous implantable defibrillator (for example, Boston Scientific's EMBLEM™ S-ICD). In such a phantom, the first layer or skin layer 100 is desirably colored, shaped, and dimensioned to mimic or simulate at least one aspect of human or animal skin. Preferably skin layer 100 provides medical professionals the sensory response of skin in terms of resistance and other properties so that skin layer 100 looks, feels, and/or responds like actual human or animal skin would when punctured or incised for device delivery and behaves like actual human or animal skin would as a device is manipulated under that skin during placement. The phantom looking and/or feeling like human or animal skin is desirable, but less important for this example. The skin layer 100 can include a reinforcing layer 500 which, in some embodiments, can be oriented diagonally to the major axes of the plain formed by the layer. The skin layer 100 can also include from about 1 to about 10% of an oil by volume of the material used to make layer 100. Similarly, layer 300, which in this phantom, simulates muscle tissue, may have a greater density or hardness than layers 200 and 300, and therefore may provide a sensory perception to the medical professional that a muscle layer has been reached during penetration or implantation. In one alternative, muscle layer 300 is not produced from a material that includes an oil. In another alternative, muscle layer 300 includes is neither produced from a material that includes an oil nor includes a reinforcing layer 500. Layer 30 or 300 may also, or instead, look like muscle tissue but need not provide tactile sensory feedback.

Layer 200, however, in this embodiment, is a simulated fat layer disposed between the muscle layer 300 and skin layer 100, respectively. Its dimensions and properties should provide appropriate sensory feedback as well. Layer 200 should have a consistency and lubricity of fat in that it should offer less resistance to penetration than the skin or muscle layers just described. In addition, or in the alternative, fat layer 200 may look like fat but need not provide tactile sensory feedback. Also, where simulated placement of a device between skin and muscle layers is the objective of phantom 99, its properties should allow the device to be manipulated into and within that layer, as if it were human or animal fat or the analogous tissue. For example, a probe or electrode moved laterally under the skin in the fat layer should mimic how the layer would feel when introducing the same probe or electrode into a human or animal. In addition to its consistency, the thickness of this layer, and thus the amount of the material used in that layer, can be varied to reflect the nature of particular parts of the body, but also the health of the subject (for example, a thin fat layer for a muscular, health individual with a low percentage of body fat, thicker fat layer for a higher percentage of body fat, something in between to represent an average percentage of body fat, and the like.) In some embodiments, the material used to produce fat layer 200 include about 10% to about 40% of at least one oil, by volume of the material used to make the layer. In some embodiments, however, it may be more desirable to increase the density, thickness or consistency of fat layer 200 so that it offers greater resistance to a probe in terms of tactile and sensory feedback to a medical professional. If the medical professional can become proficient using this type of phantom, actual surgery may be easier as the layers and phantom are considered semi-anatomic.

In some embodiments, layers 20 and 200 (and the presence of some oil in the layers 10 and 100) may also assist other layers of the phantom in providing appropriate sensory feedback. For example, using the appropriate amount and composition for the fat layer 20 or 200 and adjacent skin layer 10 or 100 can result in simulated skin properties that are more lifelike. When skin layer 10 or 100 is pinched so it can be punctured or cut, it should offer a feel and resistance that is like that of skin. Similarly, once released, layer 10 or 100 should relax back into a normal position reflecting the normal suppleness of tissue and not "snap" back elastically or remain creased. The nature, composition, and dimension of fat layer 20 or 200 can exert great influence on properties like these.

In another embodiment, a synthetic tissue phantom is provided that includes a reinforced skin layer (which includes layers 100 and 500) having a Shore hardness of from about Shore A10 to about A40, in some embodiments, from about A15 to A35, and in another embodiment, from about A20 to about A30, a fat layer 200 having a Shore hardness of from about OO0 to about OO40, and in another embodiment, from about OO1 to about OO30, and in another embodiment, from about OO5 to about OO20 and a muscle layer 300 having a Shore hardness of from about A0 to about A30, and in another embodiment, from about A5 to about A15. Preferably, at least one of skin layer 100 and fat layer 200 includes some amount of an oil.

The layers of the present invention can be made from any material that provides a structure and/or properties that meet the requirements set forth herein and, in particular, can provide a synthetic tissue phantom that is at least semi-anatomic. Materials that can be used, singularly, or in combination, include, silicone rubber, vulcanized rubber, thermoplastic elastomers, Neoprene, Tecothane, Chronoprene, latex, natural rubber, SBR synthetic rubber, and other rubbers, (collectively referred to as "rubber materials").

Particularly useful are silicone rubbers, such as described in U.S. Pat. No. 8,613,621, column 6, line 10-column 7, line 6, which are hereby incorporated by reference for its discussion of blends of so called platinum cured room temperature vulcanization silicone rubbers (these materials will be collectively referred to herein as "silicone rubbers") of various Shore A and Shore OO hardness readings. Examples of silicone rubbers include Dragon Skin®10 FAST, Dragon Skin® 10 MEDIUM, Ecoflex® OO50, each of which are all commercially available from Smooth-On, Inc., located at 5600 Lower Macungie Road, Macungie, Pa. 18062. These are silicone rubbers, which are commercially available, that provide a silicone rubber with a Shore hardness of A10, A10, and OO50, respectively, when reacted and cured as instructed.

Shore hardness reflects the hardness and/or flexibility of a solid or gel-like material and is measured by a durometer. A Shore durometer provides two different scales, "A" and "OO." According to the "A" scale silicone rubbers measure from A10 to A40, where A10 is the softest end of the scale. The "OO" scale is softer than the "A" scale, where a measurement of OO10 is softer than an OO50. The Shore OO scale is typically used for substances having the consistency of rubbers and gels, whereas the Shore A scale is typically used for measuring substances such as mold rubbers and semi-rigid plastics. A Shore A10 substance provides a Shore hardness that is approximately equal to a Shore OO of between about 50 and 60. A Shore A40 substance, which is approximately the hardness of a pencil eraser, provides a Shore hardness approximately equal to a Shore OO of almost 80. According to materials provided by Smooth-On, Inc., a "gummi" candy has a Shore hardness of OO10, but is off the Shore A scale (see, for example, https://www.smooth-on.com/page/durometer-shore-hardness-scale/).

Examples of mixtures of different silicone rubbers are also contemplated. One such mixture is a first rubber with a Shore A10 and another with a Shore A20. A second example of a suitable mixture has a Shore hardness of Shore A10 and another with a Shore OO50. A third possible mixture uses a silicone rubber with a Shore hardness of Shore OO10, and another with a Shore OO30. A final example is a mixture of silicone rubber with a Shore hardness of Shore A20 and another with a Shore OO50. It will be appreciated that this nomenclature provides for the approximate Shore hardness reading of the individual components once cured and measured. For example, a mixture of a silicone rubber with a Shore hardness of Shore OO50 and one with a Shore A10 will likely result in a Shore hardness between the two depending upon how they are mixed, the addition of other additives, and/or the relative proportions of each used in the mixture.

In some embodiments, each layer of phantom 99 includes a mixture of different silicone rubbers and provides a different Shore hardness from the other layers. For example, layer 10 or 100 may provide a Shore hardness of A20-30, layer 20 or 200 may provide a Shore hardness of OO5 to about OO20, and layer 30 or 300 may provide a Shore hardness of A5-A15.

However, in one aspect of the invention, at least one layer, and preferably all layers are made without using a blend of these different silicone rubbers. This can simplify production and reduce cost, yet provide a phantom adequate for the objectives described herein. Such layers are said to "consist essentially of a single type of silicone rubber", as discussed above. These layers may, however, include other additives, such as lubricants, softeners, thickeners, reinforcing layers, and the like. In still another embodiment, one or all of the layers uses a silicone rubber substantially free of other silicone rubbers. That is, just for example, using a silicone rubber with a Shore A10 without adding appreciable amounts of a second silicone rubber with a different Shore hardness.

Prior art phantoms are often characterized by compositions made from mixed combinations of materials such as platinum cured room temperature vulcanization silicone rubber. For example, as mentioned above, U.S. Pat. No. 8,613,621 discloses the use of a mixed combination of a silicone rubber having a Shore durometer of A10 and a having as Shore durometer of OO50. However, it has been found that by use of an oil, such as mineral oil, in accordance with the present invention one can eliminate, if desired, the need for a mixed silicone rubber composition—a single silicone rubber composition may be used. This also reduces cost, complexity, compatibility issues, and simplifies manufacturing. Thus, in some embodiments, each layer of phantom 99 includes a single silicone rubber, but provides a different Shore hardness from the other layers. For example, layer 10 or 100 may provide a Shore hardness of A15-35, layer 20 or 200 may provide a Shore hardness of OO1 to about OO30, and layer 30 or 300 may provide a Shore hardness of A0-A30.

It will be appreciated that the silicone rubbers may be produced by mixing various preparations of, for example, a silicone rubber or elastomer, in the amount of about 0.1-50% by volume of the layer and a silicone elastomer crosslinker, in the amount of about 0.1-50% by volume of the layer. Indeed, the silicone rubbers identified as a platinum cured room temperature vulcanized silicone in U.S. Pat. No. 8,613,624, can be prepared from a reaction product of, for example, Parts A and B of Smooth-On® Dragon Skin 10 Fast or Smooth-On® Dragon Skin 10 Medium. When using a silicone rubber the ratio of elastomer to crosslinker can range from 5:1 to 1:5, preferably 2:1 to 1:2, and most preferably 1:1. When two different silicone rubbers are used each produced from various reaction products of a silicone rubber and crosslinker, the amount of each can vary widely, depending upon the desired properties and can range from 99:1 to 1:99 percent by volume. It is possible to produce a "hybrid" polymer by mixing together a plurality of uncured silicone elastomers and then adding a desired amount of one or more appropriate crosslinkers. In that instance, the ratio of elastomers may vary with the number and type of elastomers, but for a mixture of the two, the relative amounts can vary from 99:1 to 1:99 percentage by volume. In another embodiment, the amount of each of a two elastomer system can vary from 10:1 to 1:10 and in still another embodiment from 5:1 to 1:5. Silicone rubber may also be mixed with other rubber materials, as described.

The amount of rubber material used in each layer will vary with the materials used, the composition of the layer, and its desired properties. However, in general, the amount of rubber material will be at least about 20% by volume of each layer. More particularly, it will make up from about 30% to about 100% by volume.

In addition to the silicone rubber, individual layers 10, 20, 30, 100, 200, and 300 may include various amounts of additives, such as thickening agents, lubricants, softeners, pigments, and reinforcement layers.

Each layer may also include at least one thickening agent, such as, for example, a thixotropic agent, in the amount of about 0.0% to about 2% by volume of the layer, in some embodiments 0.01-0.75% by volume of the layer, in some embodiments, 0.05-0.5% by volume of the layer, and in some embodiments, in the amount of about 0.05-0.3% by volume of the layer. Thixotropic agents are known for use in phantom layers, as described in U.S. Pat. No. 8,613,621. An example of a suitable thixotropic agent for use in the present invention is Smooth-On, Inc.'s Thi-Vex®, Dow Corning's RM-2051 or PlatThix.

Each layer may also include a lubricant present in the amount of about 0.0-60% by volume of an individual layer. In some embodiments, the lubricant is present in the amount of about 0.1-40.0% by volume of the layer. In some embodiments, the lubricant is present in the amount of about 3-10% by volume of the layer. In some embodiments, the lubricant is present in the amount of 10-40% by volume of the layer. In still other embodiments, the lubricant is used in an amount of about 20-35% by volume of the layer. In some embodiments, the lubricant is an oil. In one particular embodiment, the oil is mineral oil.

Mineral oil refers to a class of generally colorless and odorless mixtures of alkanes from a mineral source, such as distillates of petroleum. Mineral oils are available in several "heavy" and "light" grades. Preferred mineral oils useful in accordance with the invention include, for example, 100% White Mineral Oil, from W.S. Dodge Oil Co., CAS #8042-47-5. The amount of mineral oil can generally range from about 0.1% to about 50% and more preferably 0.5% to about 45% and even more preferably 1.0% to about 40% by volume of the materials used in the specific layer.

Other oils can be used as a lubricant in addition to, or instead of mineral oil. These include, without limitation: silicone oils, such as Dow Corning®'s MDX4-4150, MDX 350 and Dow 360, natural oils, such as safflower oil, corn oil, canola oil, coconut oil, almond/flax seed oils, and animal based oils, such as Crisco®. When other oils are used as lubricants the oils are generally used in an amount that is greater than the corresponding amount of mineral oil used. The required amount may be 1.5, two, or even three times more oil than the corresponding amount of mineral oil to arrive at the proper consistency of the layer. Thus, for example, in layer 10 or 100, the amount of oil used may require 1-4% by volume of mineral oil but as much as 12% by volume of a silicone oil would be necessary to achieve the desired result.

Layers 10, 20, 30, 100, 200, and 300 may include a softening agent or softener that may be used to soften the feel of the silicone rubber. An example of a suitable softening agent, as described in U.S. Pat. No. 8,631,621, is called Slacker®, which is available from Smooth-On, Inc., which is used to alter the "feel" of silicones and, in the world of special effects makeup, to produce masks and other applications simulating wounds, scars, and "gel-filled" skin effects that can feel like human skin. Each individual layer may include a softening agent present in the amount of about 0.0-70% by volume of an individual layer. In one embodiment, the softening agent is present in the amount of about 10-60% by volume of the individual layer. In one embodiment, the softening agent is present in the amount of about 25-50% by volume of the individual layer.

Layers 10, 20, 30, 100, 200, and 300 may also include a colorant or pigment that alters the color of the layer. Examples of pigments that may be used include any color pigments offered by Smooth-On, Inc., such as Silc-Pig® Flesh, Silc-Pig® Yellow, Silc-Pig® Red, or Silc-Pig® Blood. The colorant or pigment may be present in an amount of about 0.0% to about 3.0% in each layer, or from about 0.0% to about 0.75% in each layer.

Layer 10 or 100

Turning to specific embodiments, layer 10 or 100 may have a thickness of about 0.5 mm to about 5 mm, and preferably about 2.0 mm to about 3 mm. Layer 10 or 100 may have a Shore hardness of A8 or above, or from about A10 to about A40, or from about A15 to about A35, and preferably from about A20 to about 30. Layer 10 or 100 may also include an oil in the amount of about 0.1% to about 5% by volume of the layer, and preferably about 1% to about 4% by volume of the layer. In one particular embodiment, the oil is mineral oil used in the amount of about 1 to about 10% by volume of layer 10 or 100. Layer 10 or 100 may also include a thickener, such as a thixotropic agent, such as Smooth-On's Thi-Vex, Dow Corning's RM-2051, or PlatThix, present in the amount of about 0.0% to about 2% by volume of the layer, and preferably from about 0.05% to about 0.25% by volume of the layer.

In some embodiments, layer 10 or 100 further includes a colorant. In some embodiments, the colorant mimics the color of human skin, such as Silc-Pig flesh pigment. In some embodiments, the colorant, such as Silc-Pig Flesh, may be present in the amount of about 0.1% to about 1% by volume of layer 10 or 100.

Figure 3:
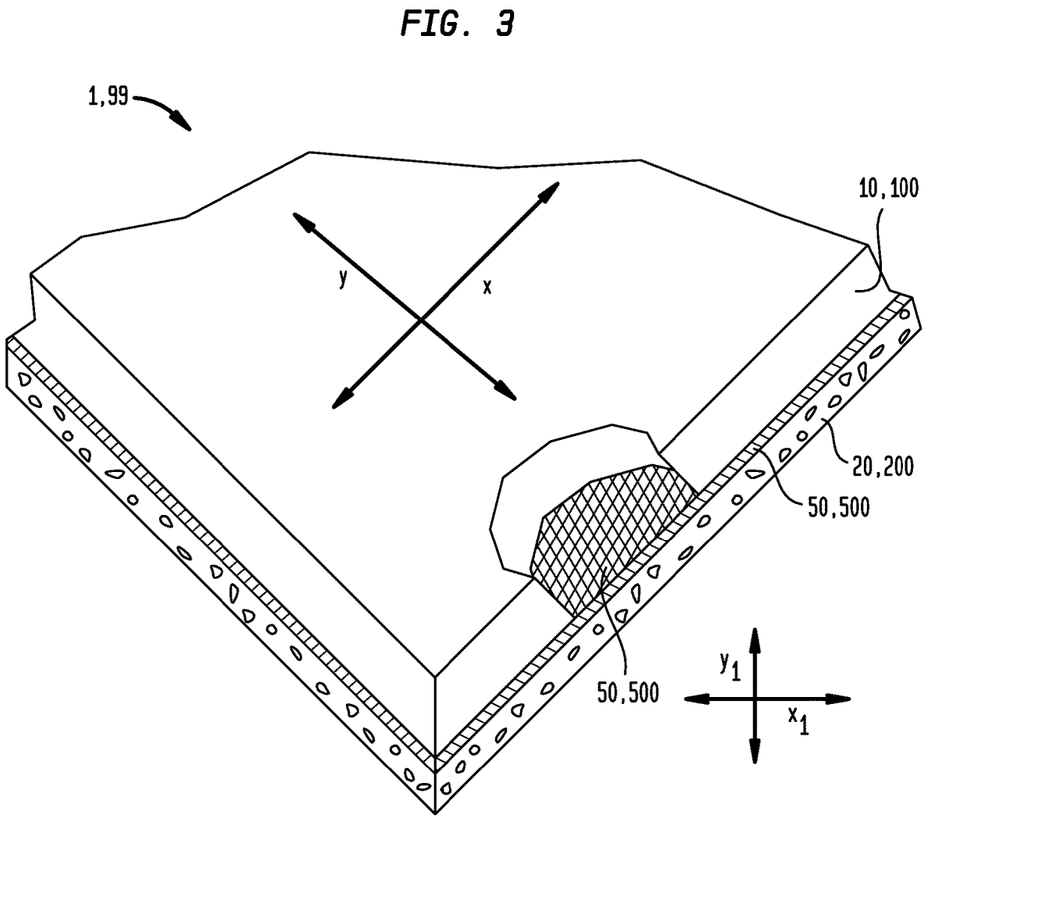
FIG. 3 is a perspective view, in partial cross-section, showing the diagonal alignment of an optional layer of woven reinforcing material.

As shown in detail in FIG. 3, in some embodiments layer 10 or 100 further includes reinforcing layer 50 or 500. In some embodiments, the reinforcing layer composed of a woven or non-woven fabric made from any natural or synthetic fabric. Including, without limitation, polyester, rayon, nylon, acrylic, fiber blends, cotton, wool, and blends. In one embodiment, reinforcing layer 50 and/or 500 can be produced from TYVEK® or SORONA® materials, which are available from DuPont, Inc. TYVEK® is a spun bounded olefin sheet material and SORONA® is a renewably sourced fiber product including about 37% plant based materials. In some embodiments, reinforcing layer 50 or 500 may include a nonwoven cellulose/polyester blend, such as TexWipe®'s TX609 TechniCloth nonwoven wipes. In one particular embodiment, the layer includes a woven fabric made of polyester. If a fiber reinforcing layer is used in a simulated skin layer 10, it can be used to provide structural integrity and or to modify the properties of the phantom. For example, the use of certain fiber reinforcing layer 500 can alter the sensory feedback associated with the behavior and feel of skin that is punctured or incised. It has been found that in addition to the selection of the material used in the reinforcing layer, its orientation may also influence predetermined properties such as sensory feedback.

In some embodiments, the direction of the weave of a fabric reinforcing layer (50 and 500) may be oriented based on the intended insertion tool. Indeed, in a preferred embodiment, the direction of the weave of the fabric (as shown by the direction of axes $x_1$ and $y_1$ in FIG. 3) is oriented at an angle to the major axes of the phantom 99 (as shown by the directions of axes X and Y in FIG. 3), such as from about 30 to about 60 degrees, and in one embodiment, 45 degrees or angled based on the direction of the intended use. In some embodiments, reinforcing layer 50 or 500 may include a plurality of fiber layers, which may be oriented in the same or opposing angles. In some embodiments, reinforcing layer 50 or 500 is located within layer 10 or 100 and formed integrally within layer 10 and 100. It can be disposed at any depth within layer 10 or 100. In some embodiments, reinforcing layer 50 or 500 is located at least 1 mm below the surface of the top or outer surface of phantom 99. In other embodiments, it is disposed, affixed or attached on one of the major surfaces of layer 10 or 100 where reinforcing layer 50 or 500 will be in intimate contact with layer 20 or 200 when formed thereon. This embodiment is illustrated in FIG. 3.

Layer 20 or 200

Layer 20 or 200 can generally be composed of the same materials discussed above in connection with layer 10 or 100, although the proportions of various ingredients can vary and the specific selection of certain materials may differ. For example, in simulating fat, the pigment used would often be different than that used to color a layer to simulate skin. Moreover, the selection of ingredients, and the amounts used can vary to provide predetermined properties more consistent with a fat layer 200.

For example, layer 20 or 200 may have a thickness of about 0.5 mm to about 5 mm, and preferably about 2 mm to about 4 mm. Layer 20 or 200 may have a Shore hardness of less than OO50, or from about OO0 to about OO40, in some aspects layer 20 or 200 may have a Shore hardness of about OO1 to about OO30, and preferably from about OO5 to about OO20. Layer 20 or 200 may also include an oil in the amount of about 1% to about 40% by volume of the layer, and preferably about 20% to about 35% by volume of the layer. In one particular embodiment, the oil is mineral oil used. Layer 20 or 200 may also include a softening agent, such as Slacker®, present in the amount of about 0% to about 70% by volume of the layer, in some embodiments, 10-60% by volume of the layer, and preferably from about 25% to about 50% by volume of the layer.

The construction of simulated tissue with "fat" layers has been disclosed in, for example, U.S. Pat. No. 8,613,621. In particular, U.S. Pat. No. 8,631,621 describes producing a fat-like material from various proportions of silicone rubbers with or without a softener, such as a so-called "SLACKER," available from Smooth-ON, Inc., 5600 Lower Macungie Road, Macungie, Pa. 18062, which is used to alter the "feel" of silicones and, in the world of special effects makeup, to produce masks and other applications simulating wounds, scars, and "gel-filled" skin effects that can feel like human skin. See U.S. Pat. No. 8,631,621 at column 7, lines 12-58, which as mentioned above, is incorporated by reference for its discussion of the composition of a fat layer, or artificial subcutaneous layer. Such materials can be used in a phantom of the invention.

It has been found, however, that even using a "slacker", the properties of the resulting material may not be sufficiently representative of the feel or other sensory feedback of a human or animal fat layer. This is particularly true when the phantom is to be used to simulate the feel of tissue when placing a medical device subcutaneously (i.e. under at least layer 10 or 100) into the phantom. It had been found that the addition of an oil, in addition to and/or to replace conventional softeners or slackers, surprisingly, may result in more realistic properties, which is particularly important for layer 20 and/or 200 and the phantoms made using it. The addition of oil to other layers, such as the skin layer 10, can also offer performance advantages.

In addition, because of the use of oil, one can use less additives, such as "slackers", reducing cost and simplifying production. Thus in one embodiment, the invention contemplates a phantom including layer 20 or 200 that includes an oil and substantially no additional softener or slacker. In another embodiment, layer 20 or 200 of the phantom includes both oil and a softener or slacker.

Layer 30 or 300

Layer 30 or 300 can generally be composed of the same materials discussed above in connection with skin layer 10 or 100, although the proportions of various ingredients can vary and the specific selection of certain materials may differ. For example, in some embodiments, while it may be desirable to include a reinforcing layer 50 or 500 in layer 30 or 300, and/or there will be no lubricant or softener used. Moreover, the selection of ingredients, and the amounts used will vary to provide predetermined properties more consistent with a muscle layer. In some embodiments, layer 30 or 300 may include nothing more than a rubber material (a single type or a mixture of different rubber materials) and a colorant or pigment. Indeed, in some embodiments, even the colorant or pigment may be eliminated.

In some embodiments, layer 30 or 300 can be virtually 100% silicone rubber. Layer 30 or 300 may, however, include other additives, such as those discussed in relation to layers 10, 20, 100, and 200. In some embodiments, layer 30 or 300 may further include a colorant in the amount of about 0.0% to about 0.75% by volume of the layer and preferably from about 0.1% to about 0.5%. In some embodiments, the colorant mimics the color of human muscle or blood, such as Smooth-On, Inc.'s Silc-Pig Blood pigment. In some embodiments, layer 30 may further include a lubricant, such as mineral oil, present in the amount of about 0.0% to about 30% by volume of the layer, and preferably from about 0.0% to about 10%. In some embodiments, layer 30 or 300 may also include a thickening agent present in the amount of about 0.0% to about 5% by volume of the layer, and preferably from about 0.0% to about 2%. In one embodiment, layer 30 may further include a softener or slacker present in the amount of about 0.0% to about 50% by volume of the layer, and preferably from about 0.0% to about 25%.

For certain applications, the thickness of layer 30 or 300 can vary to balance weight and/or cost of the phantom with providing structural integrity and rigidity of the phantom, while still providing the proper tactile sensory feedback. Accordingly, layer 30 or 300 may have a thickness of at least 1 mm, and preferably at least 3 mm, and in some embodiments it may have a thickness of about 3 mm to about 30 mm. Layer 30 or 300 may have any Shore hardness, or a Shore hardness of at least A0, in some embodiments, the Shore hardness may be from about A0 to about A30, and preferably from about A5 to about A15. In one embodiment, layer 30 or 300 has a Shore hardness that is greater than layer 20 or 200, but less than or equal to layer 10 or 100. In another embodiment, layer 30 or 300 consists essentially of a single silicone rubber (and optionally a pigment) and reinforcing layer, but is manufactured with substantially no oil, and has a Shore hardness of about A5 to about A15.

Layer 40 or 400

Multilayered construct 1 and phantom 99 may further include edge layer 40 or 400, which can retain the oil and other components dissolved, disbursed, or distributed in the other layers, thus preventing any oil or components from leaking out of the phantom. Oil leakage, for example, might change the properties of the structure or phantom, and/or from interacting with other surfaces or items in the phantom's proximity. The edge layer 40 or 400 can be made from any material including rubber materials as described herein. Edge layer 40 or 400 need not be made from the same rubber material used in structure 1 or phantom 99. In one embodiment, edge layer 40 or 400 includes a silicone rubber and can also include a thixotropic agent. In one embodiment, edge layer 40 or 400 includes a silicone rubber, a thixotropic agent, and a pigment. Edge layer 40 or 400 may further include indicia or other materials suspended, dispersed, or otherwise contained within the layers. The amount of silicone rubber used to produce edge layer 40 or 400 may be about 100% of the layer. This amount may be reduced by the amount of additives used, if any. A thickener, particularly a thixotropic agent, may be added to layer 40 or 400 in the amount of about 0.0% to about 2.0% by volume of layer 40 or 400, and preferably about 0.0% to about 0.5% by volume. A pigment may be added to layer 40 or 400 in the amount of amount of about 0.0% to about 1.0% by volume of layer 40 or 400, and preferably about 0.0% to about 0.5% by volume. The pigment may be selected from any of the pigments mentioned above in regards to layers 10, 20, 30, 100, 200, or 300. Edge 40 or 400 may also be extruded to coat and protect one of the major surfaces of phantom 99. For example, the exposed major surface of muscle layer 40 or 400 may be over coated with edge layer 50 or 500 to protect layer 40 or 400 from direct contact to a surface.

In some embodiments, edge layer 40 or 400 is applied via a brush to the outer edge of the phantom. In some embodiments, edge layer 40 or 400 is applied via a gloved finger, a foam brush, a tongue depressor, or a spatula. In some embodiments, edge layer 400 is applied to the edges of a mold prior to the addition of layers 10, 20, and 30. Structure 1 or phantom 99 may also include various surfaces "dipped" into a rubber material, which will form an edge.

In some embodiments, layer 400 may be about 0.0 mm to about 10 mm thick. In some embodiments, layer 400 may have any Shore hardness, or a Shore hardness of about A0 to about 40.

Blunt dissection is known by those of skill in the art as the separation of tissues of a human or animal by the use of one's fingers or a blunt instrument, such as a dissection tool, during a surgical procedure. Blunt dissection is distinct from sharp dissection, which involves slicing through human or animal tissue with a scalpel, scissors, electrosurgery, or other techniques that may involve heat. Blunt dissection is typically used in breast enhancement, reconstruction procedures, and other cosmetic style implant type procedures as it results in fewer complications when compared to sharp dissection. The blunt dissection force is defined as the amount of force necessary to create the dissection in the human, animal, or synthetic tissue. It may also be used to gauge the semi-anatomical sensory feedback of a phantom compared to human or animal tissue. Blunt dissection force may be measured by a force gauge, such as a Mark-10 Force Gauge Model M3-50. The insertion force is defined as the amount of force necessary to insert the medical device, such as the implantable cardiac monitor, into the human, animal, or synthetic tissue. Thus, this is another way to gauge the semi-anatomic sensory feedback of a phantom relative to actual tissue. Insertion force may be measured by a force gauge, such as a Mark-10 Force Gauge Model M3-50. In some embodiments, certain layers of the inventive phantom may intentionally be made less anatomically similar (easier or harder) to an actual human or animal to prepare physicians or surgeons for more difficult experiences they may encounter when attempting to insert the device into a human or animal. For example, in these instances, the insertion force required to insert a medical device into the phantom may be much greater than the insertion force required to insert the medical device into a human or animal.

As the skin, fat and musculature of fresh human cadavers are similar to living humans, cadavers are frequently used to test and simulate dissection and insertion of medical devices. Fresh human cadavers may therefore also be used to test and simulate the required force required for blunt dissection of the human or animal and to test the force required for insertion of the medical device, such as an ICM. They may also be used comparatively to phantoms. When working with cadavers, for example, a "short" introducer of a tool may be inserted into the surface of the cadaver and the nose of the tool may be used to separate the skin and fat in the subcutaneous layer of the cadaver, which creates a pocket. The tool may simply push, wedge, compress, or break any connective tissue that it may come into contact with in the cadaver, but does not typically cut the tissue. The short introducer may be replaced with a standard introducer, which may be used for insertion of the medical device. A housing piece may then be attached to the insertion tool. The insertion tool may then be inserted into the pocket until a hard stop is obtained. The blunt dissection force may be measured using a force gauge.

Similarly, the above-referenced cadaver test may be used on phantom 99 to test the force required for blunt dissection of the phantom and to test the force required for insertion of the medical device into the phantom. First an incision may be made into the surface of the phantom. Then the "short" introducer tool may be inserted into the surface of the phantom and the nose of the tool may be used to separate the skin and fat in the subcutaneous layer of the cadaver, which creates a pocket. The short introducer may be replaced with a standard introducer, which may be used for insertion of the medical device. A housing piece may then be attached to the insertion tool. The insertion tool may then be inserted into the pocket until a hard stop is obtained. Force can be measured with a force gauge.

A phantom can be produced to exhibit higher or lower insertion forces than what a practitioner would experience during a surgical procedure on a human or animal patient. For example, a phantom that requires a higher insertion force may provide the practitioner with more difficult experience, which for training purposes may be considered an advantage. Of course, the phantom can be constructed to provide an equivalent insertion force or even a lower insertion force as desired. This can all be estimated by comparative use between the phantom and fresh human or animal cadavers. Alternatively, the phantom can be constructed to provide other properties, similar to the tissue or organ of interest.

Figure 4:
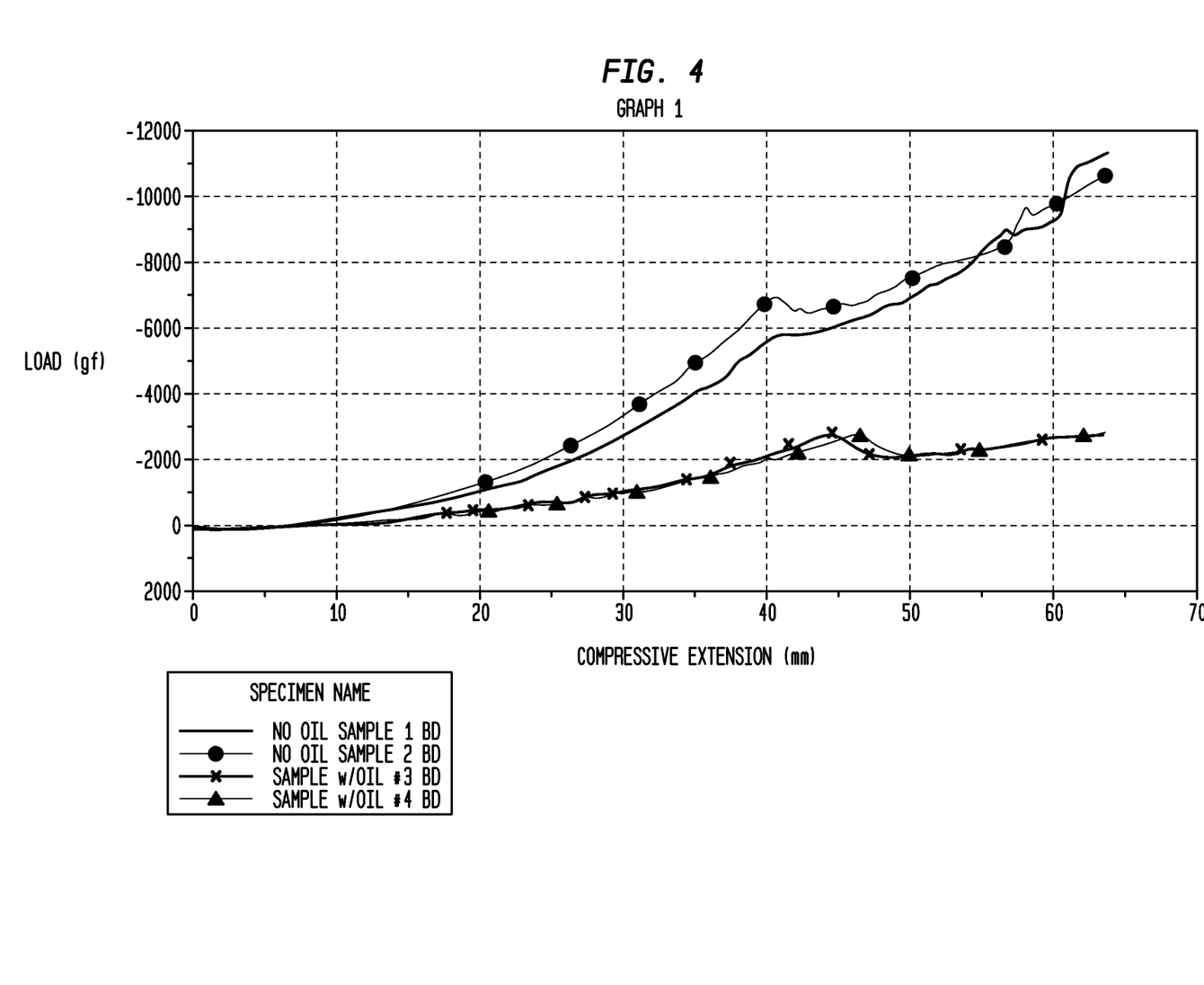
FIG. 4. is a graph comparing the insertion forces of fat layer compositions with and without oil.

As noted earlier, the addition of oil to the phantom provides unique and desirable properties. Oil's inclusion in the skin layer provided elasticity and suppleness, which imparted unexpected realism and tactile feedback. Oil's inclusion in the fat layer provided significantly decreased blunt dissection force, as shown in FIG. 4, yet it remained a cohesive layer of material that behaved much more closely to human or animal fat than a layer that did not include oil. Increases in other components instead of oil, such as a higher content of a softener like Slacker, is neither as effective in terms of physical properties, such as blunt dissection force, a realistic of a consistency and performance. For example, use of greater than 50% by volume of a Slacker may provide clumps and aggregates in the layer, which prevents the flow behavior, appearance, and tactile feedback of fat.

Before describing at least one embodiment of the invention in detail, it is to be understood that the invention is not limited in its application to the details set forth in the following description or exemplified by the examples. The invention is capable of other embodiments or of being practiced or carried out in various ways. Also, it is to be understood that the phrasing and terminology employed herein is for the purpose of description and should not be regarded as limiting.

The following examples are for purpose of illustration only and are not intended to limit the scope of the invention as defined in the claims hereinafter.

Example 1: Preparation of a Synthetic Tissue Phantom

Formation of Synthetic Skin Layer:

19.5 ml of Part B (Smooth-On® Dragon Skin 10 Fast) was combined with 2 ml of mineral oil and 0.7 ml of the silicone thixotropic agent Thi-Vex in a container. Then 0.1 ml of Silc-Pig flesh pigment was added to the container. The contents were mixed until uniform.

19.5 ml of Part A (Smooth-On® Dragon Skin 10 Fast) was added to the container and mixed until uniform. Thus, in percent by volume, the skin layer included about 94.73% silicone rubber (Parts A and B), about 0.17% thickener, about 4.86% lubricant, and about 0.24% pigment.

The contents of the container were spread into a 6 inch by 5 inch mold with a spatula. A 9"×9" TX609 TechniCloth Nonwoven Wipe was cut into a 6 inch by 5 inch piece and placed over the spread contents so as to completely cover the layer of skin material in the mold. The weave of the fabric was positioned such that it was at a 45 degree angle to the major axes of the mold. A thin layer of the remaining contents was spread over the fibrous reinforcement sheet and applied to the sides of the mold to form an edge layer. In this embodiment, the reinforcing sheet was integral and internal within the skin layer at a depth of more than 1 mm below what will be the surface of the phantom. However, it is also contemplated that the reinforcing sheet can be merely placed over the skin layer and be covered by the next successive layer.

The layer was left to cure at ambient temperature for at least 90 minutes. The cured layer had a thickness of 2.3 mm and a Shore hardness of A23.5.

Formation of Synthetic Fat Layer:

To make a 5-6 mm thick layer, 38 ml of Part B (Smooth-On® Dragon Skin 10 Fast) was combined with 40.5 ml of mineral oil and 38 ml of Smooth-On® Slacker in a container. Then 0.3 ml of yellow Silc-Pig pigment was added to the container. The contents were mixed until uniform and the consistency of a stirred egg. 38 ml of Part A (Smooth-On® Dragon Skin 10 Fast) was then added to the container. Thus, in percent by volume, the 5-6 mm fat layer included about 49.1% silicone rubber (Parts A and B), about 24.6% softener, about 26.2% lubricant, and about 0.2% pigment. The contents were again mixed until uniform and the consistency of a stirred egg. The contents of the container were poured into the mold and evenly distributed over the skin layer. The layer was left to cure at ambient temperature for at least 60 minutes. The cured layer had an approximate thickness of 6 mm and a Shore hardness of OO13.4.

To make a 8-9 mm layer, 51 ml of Part B (Smooth-On® Dragon Skin 10 Fast) was combined with 54 ml of mineral oil and 51 ml of Smooth-On® Slacker in a container. Then 0.5 ml of yellow Silc-Pig pigment was added to the container. The contents were mixed until uniform and the consistency of a stirred egg. 51 ml of Part A (Smooth-On® Dragon Skin 10 Fast) was then added to the container. The contents were again mixed until uniform and the consistency of a stirred egg. The contents of the container were poured into the mold and evenly distributed over the skin layer. The layer was left to cure at ambient temperature for at least 90 minutes. The cured layer had an approximate thickness of 8 mm.

To make a 10-11 mm layer, 64 ml of Part B (Smooth-On® Dragon Skin 10 Fast) was combined with 68 ml of mineral oil and 64 ml of Smooth-On® Slacker in a container. Then 0.5 ml of yellow Silc-Pig pigment was added to the container. The contents were mixed until uniform and the consistency of a stirred egg. 64 ml of Part A (Smooth-On® Dragon Skin 10 Fast) was added to the container. The contents were again mixed until uniform and the consistency of a stirred egg. The contents of the container were poured into the mold and evenly distributed over the skin layer. The layer was left to cure at ambient temperature for at least 90 minutes. The cured layer had an approximate thickness of 10 mm.

Formation of Synthetic Muscle Layer:

60 ml of Part B (Smooth-On® Dragon Skin 10 Fast) was combined with 0.5 ml of blood color Silc-Pig pigment in a container. The contents were mixed until uniform. 60 ml of Part A (Smooth-On® Dragon Skin 10 Fast) was added to the container. The contents were stirred until uniform consistency was obtained. Thus this layer included about 99.6% silicone rubber by volume and about 0.4% pigment by volume.

The contents of the container were placed over the fat layer. The layer was left to cure at ambient temperature for at least 8 hours. The cured muscle layer had a thickness of between 6-8 mm and a Shore hardness of A7.7.

Example 2: Evaluation of the Effect of Oil Content in a Fat Layer

A synthetic fat was prepared according to the 8-9 mm layer described in Example 1, i.e. 51 ml of Slacker, 51 ml of Part A, 51 ml of Part B, and 54 ml of mineral oil. Two 60 cc syringe tubes, having a length of 4⅛ inches and a diameter of 1 inch, were capped and filled with the simulated fat of Example 1. The syringe tubes were filled to the 60 cc mark and any excess was discarded. The synthetic fat in the tubes was permitted to cure in accordance with Example 1.

Another batch of synthetic fat was prepared, which included the same amount of Slacker, Part A and Part B, but did not include mineral oil, i.e. Slacker, 51 ml of Part A, and 51 ml of Part B. Two 60 cc syringe tubes, having a length of 4⅛ inches and a diameter of 1 inch, were capped and filled with the simulated fat, without any added mineral oil. The syringe tubes were filled to the 60 cc mark and any excess was discarded. The synthetic fat in the tubes was permitted to cure in accordance with Example 1

Each syringe tube was connected to the base of the INSTRON Force Station by a plate with a metal luer fitting concentric with a vertical driven 500 N load cell.

A blunt dissection ("BD") tool was clamped into the jaws of the 500 N load cell and lowered to just above the round surface of the vertical tube of each fat filled syringe. Once in place the machine lowered the BD tool at 8 inches/min for 2.5 inches, which is approximately the distance most tools/ devices will require in the actual procedure. The forces were recorded.

As shown in FIG. 4, the blunt dissection force for the syringes with oil was approximately 2,000-3,000 gf and the blunt dissection force for the syringes without oil was over 10,000 gf. Thus, the addition of oil drastically reduced the amount of force needed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A multi-layered structure comprising:
a first layer comprising a silicone rubber; and
a second layer comprising an oil and a single silicone rubber,
wherein the oil is a mineral oil, a natural oil, an animal-based oil or a combination thereof.

2. The multi-layered structure of claim 1, wherein the silicone rubber of the first layer is present in the amount of 90% to 99.9% by volume of the first layer.

3. The multi-layered structure of claim 1, wherein the silicone rubber of the second layer is present in the amount of 10% to 60% by volume of the second layer.

4. The multi-layered structure of claim 1, wherein the oil is present in the amount of 10% to 60% by volume of the second layer.

5. The multi-layered structure of claim 1, further comprising a third layer comprising a silicone rubber.

6. The multi-layered structure of claim 5, wherein the silicone rubber of the third layer is present in the amount of from 95% to 100% by volume of the third layer.

7. The multi-layered structure of claim 5, wherein the first layer has a Shore hardness of from A10 to A40, the second layer has a Shore hardness of from OOO to OO40, and the third layer has a Shore hardness of at least A0.

8. The multi-layered structure of claim 5, further comprising a fourth layer.

9. The multi-layered structure of claim 8, wherein the fourth layer is imbedded in the first layer.

10. The multi-layered structure of claim 9, wherein the Shore hardness of the combined first layer and fourth layer is greater than the Shore hardness of the third layer.

11. The multi-layered structure of claim 8, wherein the fourth layer is applied to the first layer.

12. The multi-layered structure of claim 11, wherein the Shore hardness of the combined first layer and fourth layer is greater than the Shore hardness of the third layer.

13. The multi-layered structure of claim 10, wherein the Shore hardness of the third layer is greater than the Shore hardness of the second layer.

14. The multi-layered structure of claim 9, wherein the first layer has a Shore hardness of from A10 to A40, the second layer has a Shore hardness of from OOO to OO40, and the third layer has a Shore hardness of at least A0.

15. A multi-layered structure comprising:
a first layer comprising a first single silicone rubber in an amount of from 90% to 99.9% by volume of said first layer and an oil in an amount of no more than 10% by volume of said first layer;
a second layer comprising an oil in an amount of no less than 10% by volume of said second layer, at least one softener in an amount of from 30% to 80% by volume of said second layer, and a second single silicone rubber in an amount of from 10% to 60% by volume of said second layer; and
a third layer comprising a third single silicone rubber in an amount of from 95% to 100% by volume of said third layer;
wherein the first layer has a Shore hardness of from A10 to A40, the second layer has a Shore hardness of from OOO to OO40, and the third layer has a Shore hardness of at least A0,
wherein the oil is a mineral oil, a natural oil, an animal-based oil or a combination thereof.

16. The multi-layered structure of claim 15, further comprising a fourth layer.

17. The multi-layered structure of claim 16, wherein the fourth layer is imbedded in the first layer or applied to the first layer.

18. The multi-layered structure of claim 17, wherein the Shore hardness of the combined first layer and fourth layer is greater than the Shore hardness of the third layer.

19. The multi-layered structure of claim 18, wherein the Shore hardness of the third layer is greater than the Shore hardness of the second layer.

20. A synthetic tissue phantom comprising:
(a) a synthetic skin layer comprising a first amount of a first rubber material in the amount of 94-100% by volume of the skin layer, a lubricant in the amount of 0.0-5% by volume of the skin layer, a thixotropic agent in the amount of 0.0 to 2.0% by volume of the skin layer, and a flesh pigment in the amount of 0.0 to 3% by volume of the skin layer;
(b) a synthetic fat layer comprising a second amount of a second rubber material in the amount of 15-40% by volume of the fat layer, —a lubricant in the amount of 10-40% by volume of the fat layer, —a softener in the amount of 0.0-35% by volume of the fat layer, and a pigment in the amount of 0-3% by volume of the fat layer;
(c) a synthetic muscle layer comprising a third amount of a third rubber material in the amount of 95-100% by volume of the muscle layer, and a pigment in the amount of 0-3% by volume of the muscle layer; and
(d) a reinforcing layer, wherein the reinforcing layer is in intimate contact with the skin layer;
wherein a combination of the skin layer and the reinforcing layer has a Shore hardness of A15 to A35, the fat layer has a Shore hardness of OO01 to OO30, and the muscle layer has a Shore hardness of A5 to A15,
wherein the first rubber material is a first single silicone rubber, the second rubber material is a second single silicone rubber, and the third rubber material is a third single silicone rubber, and
wherein the lubricant of the synthetic skin layer or the synthetic fat layer is an oil, and the oil is a mineral oil, a natural oil, an animal-based oil or a combination thereof.

* * * * *

UNITED STATES PATENT AND TRADEMARK OFFICE
CERTIFICATE OF CORRECTION

PATENT NO. : 10,755,600 B2  
APPLICATION NO. : 15/685606  
DATED : August 25, 2020  
INVENTOR(S) : Scott Iverson et al.

Page 1 of 1

It is certified that error appears in the above-identified patent and that said Letters Patent is hereby corrected as shown below:

On the Title Page

[72], after "Theodore Paul Dale, Corcoran, MN (US)" insert --Anthony Tran, Brooklyn Park, MN (US)--

Signed and Sealed this  
Twenty-second Day of September, 2020

Andrei Iancu  
*Director of the United States Patent and Trademark Office*